(12) United States Patent
Gibson

(10) Patent No.: US 9,398,740 B2
(45) Date of Patent: Jul. 26, 2016

(54) LEAF CORRAL FOR A LAWNMOWER

(71) Applicant: Larry Ralph Gibson, Easley, SC (US)

(72) Inventor: Larry Ralph Gibson, Easley, SC (US)

( * ) Notice: Subject to any disclaimer, the term of this patent is extended or adjusted under 35 U.S.C. 154(b) by 125 days.

(21) Appl. No.: 14/169,453

(22) Filed: Jan. 31, 2014

(65) Prior Publication Data
US 2015/0216120 A1 Aug. 6, 2015

(51) Int. Cl.
*A01D 67/00* (2006.01)
*A01D 34/00* (2006.01)
*A01D 34/81* (2006.01)
*A01D 101/00* (2006.01)

(52) U.S. Cl.
CPC .............. *A01D 34/001* (2013.01); *A01D 34/81* (2013.01); *A01D 2101/00* (2013.01)

(58) Field of Classification Search
USPC ............ 56/17.4, 255, 320.1, 320.2, 119, 17.3
See application file for complete search history.

(56) References Cited

U.S. PATENT DOCUMENTS

| | | | | |
|---|---|---|---|---|
| 2,504,268 A | * | 4/1950 | Lee | 56/255 |
| 2,539,779 A | * | 1/1951 | Grosso | 56/16.6 |
| 2,557,598 A | * | 6/1951 | Daggett | 56/17.4 |
| 2,671,299 A | * | 3/1954 | Orr | 56/17.2 |
| 2,708,818 A | * | 5/1955 | Gentry et al. | 56/17.3 |
| 2,763,116 A | * | 9/1956 | Flinchbaugh et al. | 56/13.6 |
| 2,880,563 A | * | 4/1959 | Nottmeyer | 56/17.3 |
| 2,904,947 A | * | 9/1959 | Hickel | 56/320.2 |
| 2,972,849 A | * | 2/1961 | Ridenour et al. | 56/320.2 |
| 3,190,063 A | * | 6/1965 | Epstein | 56/255 |
| 3,197,951 A | * | 8/1965 | Zick | 56/255 |
| 3,839,851 A | * | 10/1974 | Misenko | 56/255 |
| RE29,139 E | | 2/1977 | Messner | |
| 4,509,315 A | * | 4/1985 | Giguere | 56/10.7 |
| 5,101,617 A | | 4/1992 | Hare et al. | |
| 7,603,838 B1 | * | 10/2009 | Henley, Jr. | 56/13.7 |
| 8,522,518 B2 | | 9/2013 | Hirose et al. | |
| 8,539,745 B2 | * | 9/2013 | Schmidt et al. | 56/320.2 |
| 2006/0070367 A1 | * | 4/2006 | Coussins et al. | 56/320.1 |
| 2012/0272634 A1 | * | 11/2012 | Stratford et al. | 56/320.1 |
| 2013/0081370 A1 | * | 4/2013 | Koester | 56/255 |

OTHER PUBLICATIONS

Leaf Plow (www.Instructables. pp. 1-7).

* cited by examiner

*Primary Examiner* — Thomas B Will
*Assistant Examiner* — Joan D Misa
(74) *Attorney, Agent, or Firm* — Dority & Manning, P.A.

(57) ABSTRACT

A leaf corralling apparatus including a deflector plate is provided for a lawnmower to prevent an amount of leaves or other debris from being diverted around a deck of the lawnmower. The deflector plate defines a tip that is positioned at a distance from a centerline of the deck approximately equal to or greater than a distance from the centerline of an outermost point of a cutting area defined by one or more blades positioned within the deck of the lawnmower. The deflector plate additionally defines a slanted portion that extends inwardly towards the centerline and rearwardly towards a rear end of the deck.

20 Claims, 6 Drawing Sheets

LEAF CORRAL FOR A LAWNMOWER

FIELD

The present disclosure relates generally to an apparatus for minimizing the deflection of leaves or other debris around a deck of a lawnmower during operation of the lawnmower.

BACKGROUND

Lawnmowers are both residentially and commercially used for cutting grass. A major benefit of certain lawnmowers is that they may additionally pick-up leaves and/or other debris in the process, leaving a yard with a generally clean and kept appearance without the need to rake or blow the leaves out of the yard. As is known in the art, rotary lawnmowers generally include one or more blades positioned within a housing, or deck, and a motor in mechanical communication with the one or more blades. The motor may be configured to rotate the blades about an axis. When rotated, the one or more blades define a cutting area. Certain lawnmowers may further include a means for collecting grass clippings and any leaves or other debris that pass underneath the deck of the lawnmower within the cutting area of the one or more blades.

The lawnmower deck generally includes an outer periphery that surrounds the one or more blades. For a variety of reasons, the shape of the lawnmower deck, and more particularly, the outer periphery of the lawnmower deck, is generally known to conform closely to the cutting area defined by the one or more lawnmower blades. For example, such a conformed design may decrease the risk of injury to a user or bystander by preventing, e.g., a user's hands or feet from entering into the cutting area of the blades. Additionally, by conforming closely to the cutting area of the blades, the mower deck may provide a desirous air flow within the interior of the deck to more effectively collect grass clippings, leaves, and other debris that pass thereunder.

However, certain problems may exist with such a configuration. For example, the cutting area of the blades is generally circular, and thus the outer periphery of the lawnmower deck is generally circular as well. Therefore, in certain situations, for example when a large amount of leaves or other debris are present, the leaves may bunch up at a front of the deck and be diverted around a side of the deck instead of passing underneath the deck to be picked up by the lawnmower. With such a construction, it may therefore be required for the lawnmower to make multiple passes over the yard in order to effectively remove a desired amount of leaves or other debris.

Accordingly, an apparatus for minimizing the amount of leaves and other debris that are diverted around the sides of the deck of a lawnmower would be beneficial. More particularly, an apparatus for minimizing the amount of leaves and other debris that are diverted around the sides of the deck of a lawnmower while still allowing the deck to conform closely to the cutting area of the blades would be particularly useful.

BRIEF DESCRIPTION OF THE DISCLOSURE

Aspects and advantages of the invention are set forth below in the following description, or may be obvious from the description, or may be learned through practice of the invention.

In one embodiment of the present disclosure, a lawnmower is provided defining a mowing direction and a cross direction perpendicular to the mowing direction. The exemplary lawnmower includes a deck defining a centerline extending along the mowing direction of the lawnmower and at least one blade positioned within the deck. The at least one blade defines a cutting area, the cutting area including an outermost point from the centerline. The outermost point is located at a first distance from the centerline in the cross direction. The exemplary lawnmower additionally includes a leaf corralling apparatus including a deflector plate. The deflector plate is attached to or integral with the deck of the lawnmower and defines a tip and a slanted portion. The tip is located at a second distance in the cross direction from the centerline. The second distance approximately equal to or greater than the first distance. Additionally, the slanted portion extends inwardly towards the centerline and rearwardly towards the rear end of the deck. The deflector plate is configured to prevent an amount of leaves or other debris from being diverted around the deck of the lawnmower during operation of the lawnmower.

In another embodiment of the present disclosure, an apparatus is provided for preventing an amount of leaves or other debris from being diverted around a deck of a lawnmower. The lawnmower defines a mowing direction and a cross direction perpendicular to the mowing direction and includes at least one blade positioned within the deck. The deck defines a centerline extending along the mowing direction and the at least one blade defines a cutting area defining an outermost point located at a first distance in the cross-direction from the centerline. The leaf corralling apparatus includes a support member configured to attach to the deck of the lawnmower and a deflector plate attached to or integral with the support member. The deflector plate defines a tip and a slanted portion. The tip is located at a second distance in the cross direction from the centerline when the apparatus is attached to the deck. Additionally, the second distance is approximately equal to or greater than the first distance and the slanted portion extends inwardly towards the centerline and rearwardly towards a rear end of the deck when the apparatus is attached to the deck. The deflector plate is configured to prevent an amount of leaves or other debris from being diverted around the deck of the lawnmower during operation of the lawnmower.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION

Figure 1:
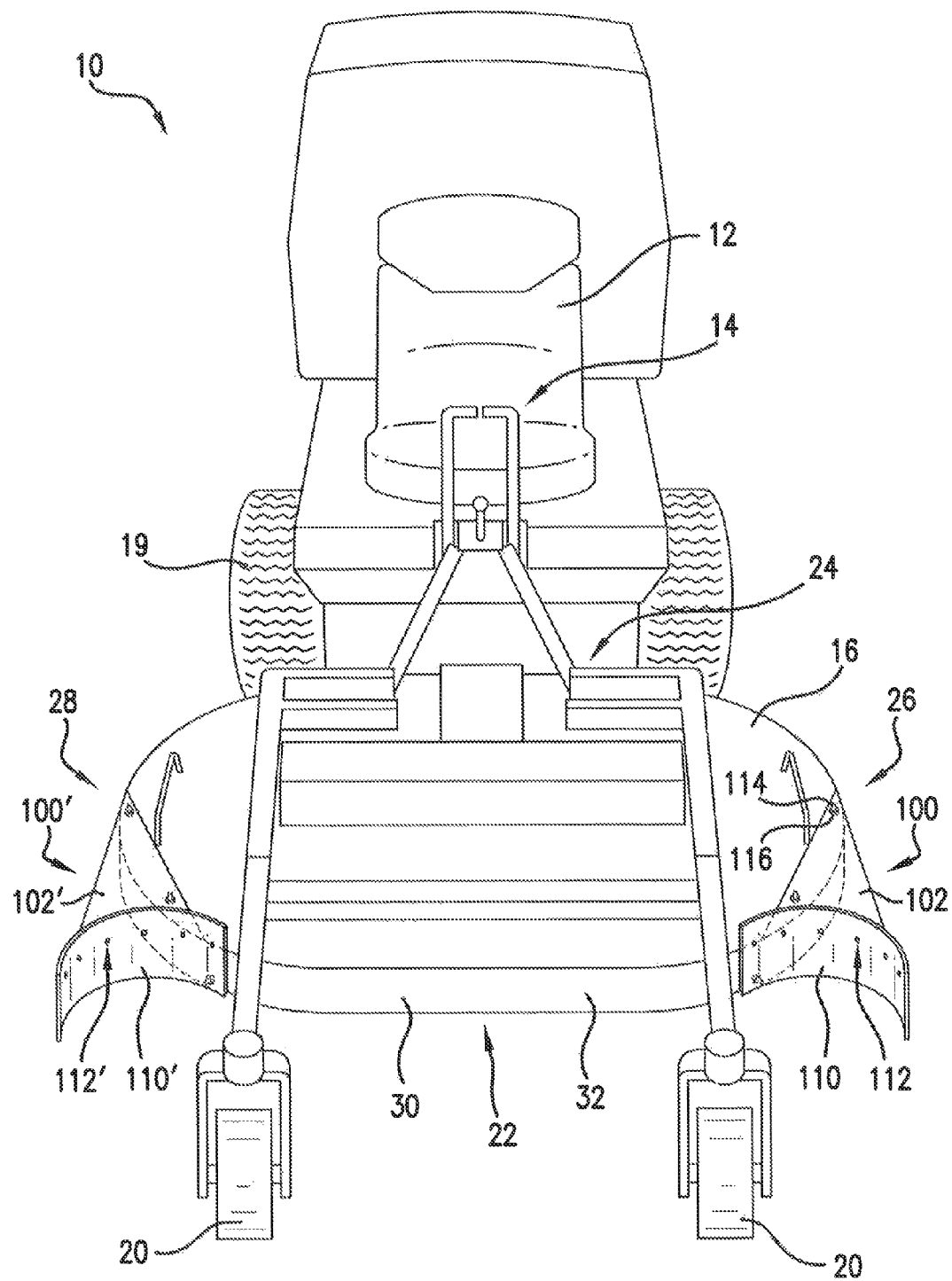
FIG. 1 is a perspective view of a lawnmower with leaf corralling apparatuses in accordance with an exemplary embodiment of the present disclosure.

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present invention without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents. Although exemplary embodiments of the present invention will be described generally in the context of a riding lawnmower for purposes of illustration, one of ordinary skill in the art will readily appreciate that embodiments of the present invention may be applied to any other type or configuration of lawnmower unless specifically limited in the claims.

The detailed description uses numerical and letter designations to refer to features in the drawings. Like or similar designations in the drawings and description have been used to refer to like or similar parts of the disclosure.

In general, the present subject matter is directed to a leaf corralling apparatus configured to be attached to or made integrally with a deck of a lawnmower. A leaf corralling apparatus in accordance with certain exemplary embodiments of the present disclosure may prevent an amount of leaves or other debris from being diverted around a side of the deck of the lawnmower during operation of the lawnmower. Accordingly, a lawnmower equipped with a leaf corralling apparatus of the present disclosure may more effectively pick up leaves or other debris when cutting a lawn, or more particularly, may pick up a desired amount of leaves or other debris without requiring a user to, e.g., overlap a cutting path, or double back to pick up leaves that were diverted around the lawnmower.

Referring now to the drawings, wherein identical numerals indicate the same elements throughout the figures, FIG. 1 provides a perspective view of a lawnmower 10 in accordance with an exemplary embodiment of the present disclosure. The exemplary lawnmower 10 of FIG. 1 generally includes a motor (not shown) configured to propel the lawnmower 10 by rotating one or both of rear wheels 19 and/or to operate one or more blades 18 positioned within a deck 16, or housing, of the lawnmower 10 (see FIGS. 3 and 4). As will be explained in greater detail below, the lawnmower 10 includes first leaf corralling apparatus 100 attached to a first side 26 of the deck 16 and a second leaf corralling apparatus 100' attached to a second side 28 of the deck 16. The exemplary lawnmower 10 additionally includes a seat 12 and a plurality of controls 14 to allow an operator to control the operation of the lawnmower 10. Accordingly, the exemplary lawnmower 10 of FIG. 1 is commonly referred to as a riding lawnmower, as a user may ride in the seat 12 and control the lawnmower 10 during operation of the lawnmower 10. A pair of front wheels 20 are also provided, attached to the deck 16 for support of the deck 16.

One having skill in the art will readily appreciate, however, that the exemplary lawnmower 10 is provided by way of example only, and that in other exemplary embodiments, the lawnmower 10 may have any other suitable configuration. For example, in other exemplary embodiments, the deck 16 may be positioned behind the seat 12, such that the deck 16 is towed behind a body of the lawnmower 10 and/or the motor may be positioned in front or underneath the seat 12. Additionally, in other exemplary embodiments, the lawnmower 10 may not include a seat 12 and instead may be a push lawnmower, a self-propelled or walk-behind lawnmower, or automated lawnmower. Furthermore, in other exemplary embodiments, the deck 16 may have any other suitable configuration for housing one or more blades.

Figure 2:
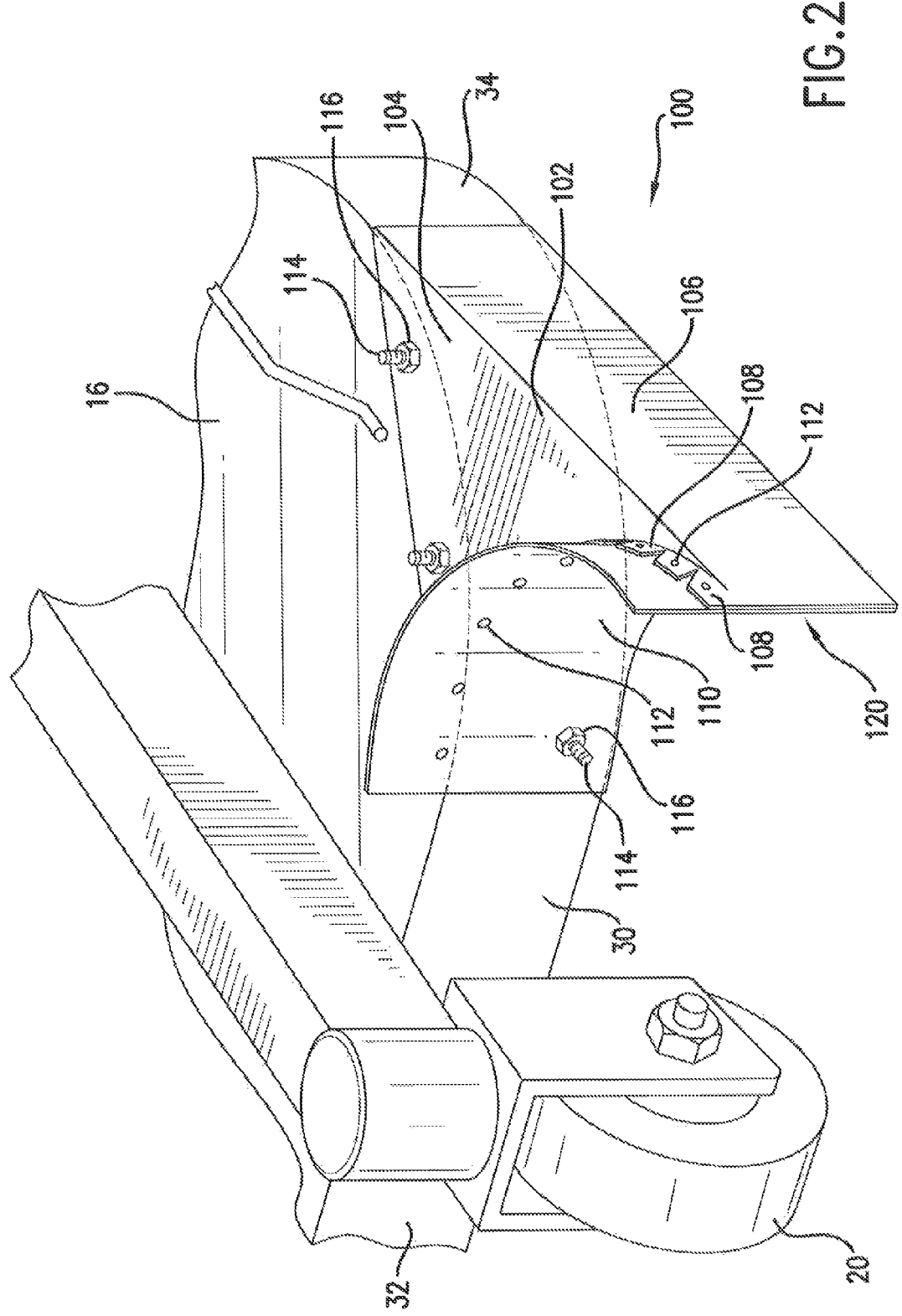
FIG. 2 is a close-up perspective view of an exemplary leaf corralling apparatus in accordance with an exemplary embodiment of the present disclosure.

With reference now to FIG. 2, a close-up perspective view of the exemplary leaf corralling apparatus 100 is provided. The apparatus 100 is shown attached to the first side 26 of the deck 16 of the exemplary lawnmower of FIG. 1. The leaf corralling apparatus 100 generally includes a support member 102 attached to or integral with the deck 16 of the lawnmower 10, and a deflector plate 110 attached to or integral with the support member 102. For the exemplary embodiment of FIG. 2, the support member 102 generally includes an outer wall 106 and a top member 104, and the deflector plate 110 generally includes a slanted portion 111 (see FIGS. 3 and 4) and a tip 120. The deflector plate 110 is attached to the support member 102 by a plurality of tabs 108 and rivets 112. Additionally, for the exemplary embodiment of FIG. 2, the apparatus 100 is attached to the deck 16 using a plurality of bolts 114 and nuts 116. As shown, the apparatus 100 of FIG. 2 includes a pair of attachment points on the top member 104 where the top member 104 overlaps a portion of the deck 16 (shown in phantom), and an attachment point on the deflector plate 110 where the deflector plate 110 is adjacent to an outer periphery 30 of the deck 16 (also shown in phantom).

It should be appreciated, however, that the leaf corralling apparatus 100 of FIG. 2 is provided by way of example only, and other exemplary embodiments of the present disclosure may have any other suitable configuration. For example, in other exemplary embodiments, the apparatus 100 may be attached to the deck 16 in any other suitable manner. For example, the apparatus 100 may be permanently attached to the deck 16, such as by welding or utilizing an epoxy or glue, or alternatively may be removably attached to the deck 16 using any suitable configuration of nuts and bolts, screws, magnets, clamps, or any other suitable means. Additionally, or alternatively, all or a portion of the apparatus 100 may be made integrally with the deck 16. For example, the apparatus 100 and deck 16 may be cast in unison in a mold. Similarly, the deflector plate 110 may be permanently or removably attached to the support member 102 in any suitable manner, or alternatively may be made integrally with the support member 102. Further, in still other exemplary embodiments, the apparatus 100 may be hingedly or slidingly attached to the deck 16 and/or the deflector plate 110 may be hingedly or slidingly attached to the support member 102 or the deck 16. In such an exemplary embodiment, the apparatus 100 and/or the deflector plate 110 may be moved into position when a user desires to utilize the apparatus 100 and moved out of position when the user desires not to utilize the apparatus 100.

It should also be appreciated that although for the exemplary embodiment of FIG. 2 the apparatus 100 is shown including a separate deflector plate 110 and support member 102, in other exemplary embodiments, the apparatus may not include a support member 102. In such an exemplary embodiment, the deflector plate 110 may be directly attached to the deck 16 in any suitable manner, or alternatively may be made integrally with the deck 16.

Figure 3:
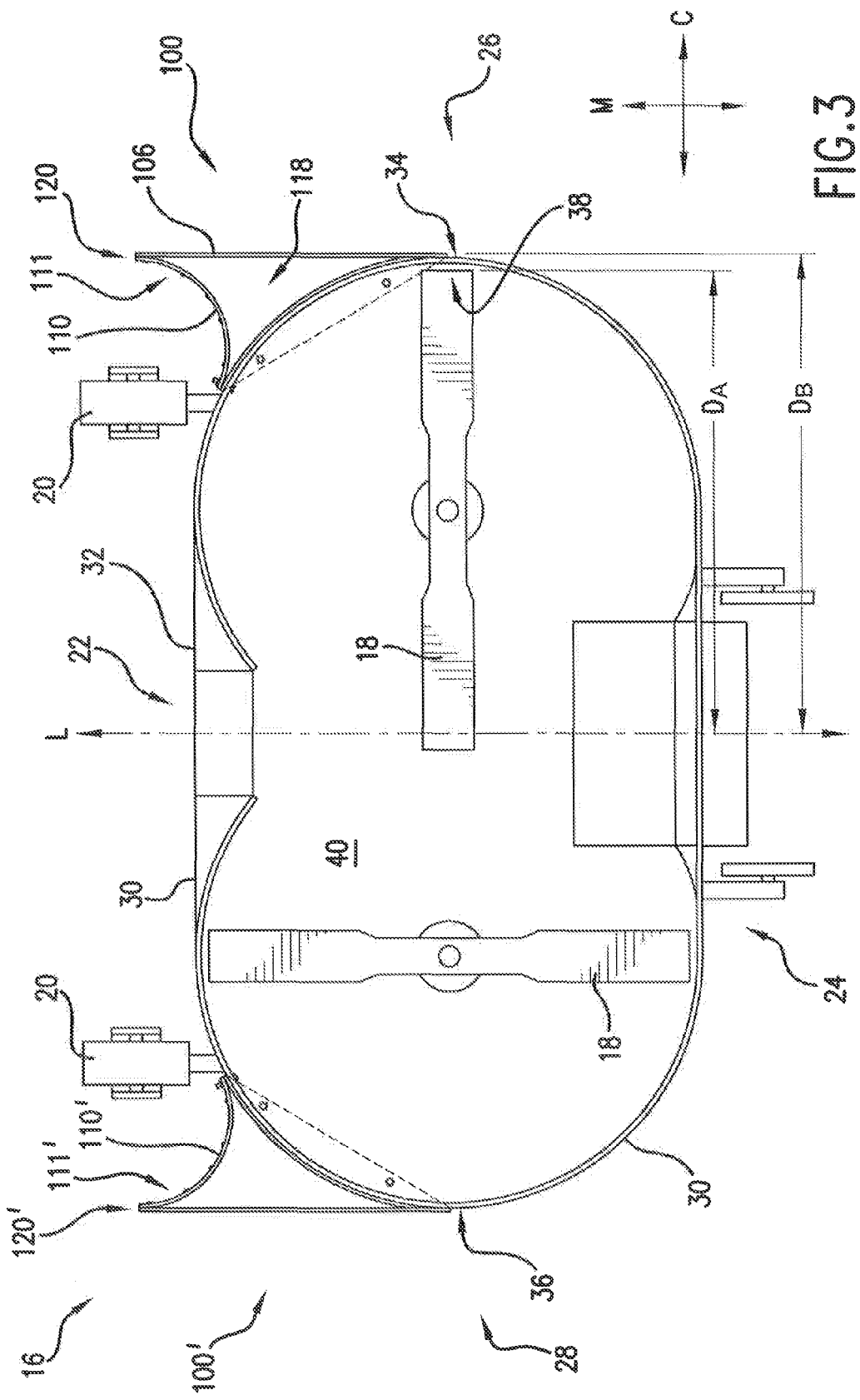
FIG. 3 is a bottom view of a deck portion of the exemplary lawnmower provided in FIG. 1.
Figure 4:
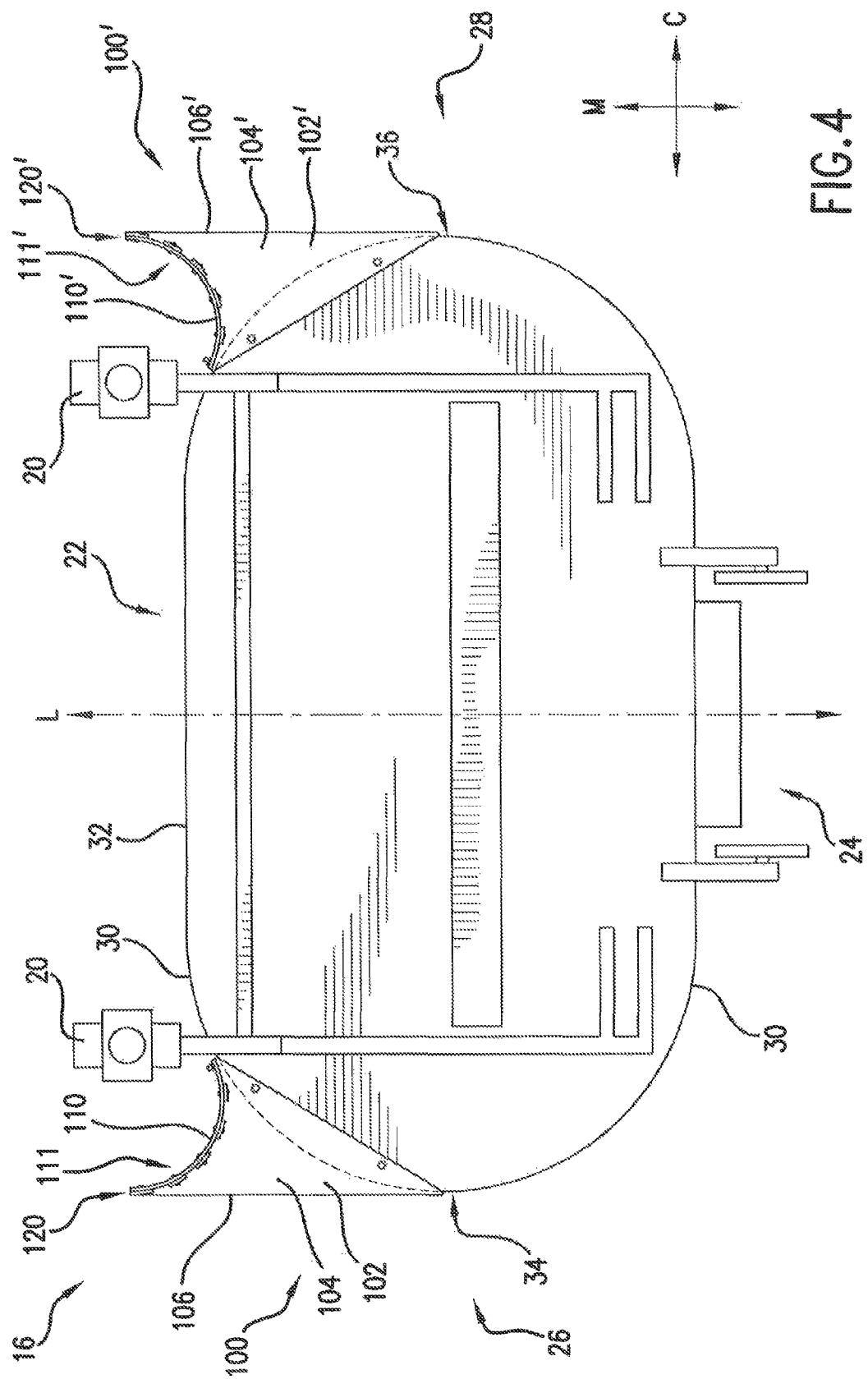
FIG. 4 is a top view of the deck portion of the exemplary lawnmower provided in FIG. 1.

With reference now to FIGS. 3 and 4, the exemplary lawnmower 10 and first and second leaf corralling apparatuses 100, 100' will be described in greater detail. FIG. 3 provides a bottom view of a deck portion of the exemplary lawnmower 10 of FIG. 1 and FIG. 4 provides a top view of the deck portion of the exemplary lawnmower of FIG. 1.

The exemplary lawnmower 10 defines a mowing direction M and a cross direction C perpendicular to the mowing direction M. As used herein, the mowing direction M refers to the direction the lawnmower is configured to move when moving straight in a forward or reverse direction. The mowing direction M and the cross direction C together define a plane that is parallel to a horizontal plane of the ground.

Referring still to FIGS. 3 and 4, the deck 16 of the lawnmower 10 defines a front end 22 and an opposite rear end 24. Additionally, as stated above, the deck 16 defines the first side 26 and the second side 28 positioned at opposite cross directional ends of the deck 16. For the exemplary embodiment of FIGS. 3 and 4, the first side 26 corresponds to a left side when viewed from the seat 12 and facing forward (see FIG. 4) and the second side corresponds to a right side when viewed from the seat 12 and facing forward (see FIG. 4). The deck 16 further defines a centerline L extending along the mowing direction M halfway between the first side 26 and second side 28. Moreover, the deck 16 generally defines an outer periphery 30 extending around a circumference of the deck 16. For the exemplary lawnmower 10 of FIGS. 3 and 4, the front wheels 20 are attached to the deck 16, but positioned away from the outer periphery 30 such that the front wheels 20 and all associated housings don't interfere or interact with the outer periphery 30.

The lawnmower 10 additionally includes at least one blade 18 positioned within the deck 16 of the lawnmower 10. More particularly, for the exemplary embodiment of FIGS. 3 and 4, the lawnmower 10 includes two blades 18 positioned within the deck 16 and configured to rotate in a complementary fashion with each other. The blades 18 define a cutting area 40 within the outer periphery 30 of the deck 16 and the cutting area 40 defines an outermost point 38 located at a first distance $D_A$ in the cross direction C from the centerline L.

As stated above, the exemplary lawnmower 10 also includes the leaf corralling apparatus 100 attached to the first side 26 of the deck 16. The tip 120 of the deflector plate 110 of the apparatus 100 is located at a second distance $D_B$ in the cross direction C from the centerline L, when the apparatus 100 is attached to or integral with the deck 16. The distance $D_B$ is approximately equal to or greater than the distance $D_A$ of the outermost point 38 of the cutting area 40 to the centerline L. The deck 16 of the lawnmower 10 additionally defines a leading edge 32 at the front end 22. As shown, for the exemplary embodiment of FIGS. 3 and 4, the tip 120 is positioned farther forward in the mowing direction M than the leading edge 32. For the exemplary embodiment of FIGS. 3 and 4, the tip 120 also defines a width in the cross direction C no wider than the width of the deflector plate 110 and outer wall 106 of the support member 102. Accordingly, the tip 120 may define a width of less than about 1 inch in the cross direction C.

It should be appreciated, however, that in other exemplary embodiments, the tip 120 may be in any other suitable location relative to the centerline L and the leading edge 32. For example, the first side 26 of the deck 16 defines an outer edge 34 located at a distance from the centerline L. In other exemplary embodiments, the distance $D_B$ of the tip 120 from the centerline L may be approximately equal to or greater than the distance of the outer edge 34 to the centerline L. Additionally, the tip 120 may be positioned approximately the same distance forward in the mowing direction M as the front edge 32 of the deck 16, or alternatively the front edge 32 may be positioned farther forward in the mowing direction M than the tip 120. Moreover, in still other exemplary embodiments, the tip 120 may define any other suitable width in the cross direction C. For example, in other exemplary embodiments, the tip 120 may be less than about 3 inches, less than about 2 inches, less than about 0.75 inches, less than about 0.5 inches, or less than about 0.25 inches.

With continued reference to FIGS. 3 and 4, when the apparatus 100 is attached to or integral with the deck 16, the slanted portion 111 of the deflector plate 110 extends generally from the tip 120 towards the deck 16, or more particularly, the slanted portion 111 extends inwardly towards the centerline L and rearwardly towards the rear end 24 of the deck 16. The location and width of the tip 120 and the shape of the deflector plate 110, including the slanted portion 111, may prevent an amount of leaves or other debris from being diverted around the deck 16 of the lawnmower 10 during operation of the lawnmower 10. For the exemplary embodiment of FIGS. 3 and 4, the deflector plate 110, including slanted portion 111, defines a curved shape as it moves from the tip 120 towards the deck 16.

Moreover, as stated above, the support member 102 of the leaf corralling apparatus 100 includes the outer wall 106 and the top member 104. For the exemplary embodiment of FIGS. 3 and 4, the outer wall 106 extends from an outer edge 34 of the deck 16 to the tip 120 of the deflector plate 110. Additionally, with specific reference to FIG. 3, the outer wall 106, the top member 104, and the deflector plate 110 define an opening 118. The opening 118 may assist in preventing an amount of leaves or other debris from being diverted around the deck 16 of the lawnmower 10 during operation of the lawnmower 10. More particularly, during operation of the lawnmower 10, after leaves or other debris pass under the deflector plate 110, the leaves or other debris may be contained in the opening 118 until they are able to pass under the outer periphery 30 of the deck 16. The outer wall 106 may direct any leaves positioned in the opening 118 under the deck 16 of the lawnmower 10, such that they are not diverted around the outer periphery 30 of the deck 16 of the lawnmower 10.

It should be appreciated, however, that in other exemplary embodiments the leaf corralling apparatus 100 may have any other suitable shape or configuration. For example, in other exemplary embodiments, the deflector plate 110, including the slanted portion 111, may have any other suitable shape. For example, in other exemplary embodiments, the deflector plate 110 may extend directly in a straight line to the deck 16. Additionally, the support member 102 of the apparatus 100 may have any other suitable shape or construction. For example, in certain exemplary embodiments, the support member 102 may not include the outer wall 106, or alternatively may not include the top member 104. Further, the support member 102 may additionally or alternatively include one or more additional plates, bars, or other structural elements attached to or integral with the deflector plate 110 and/or the deck 16, or within the support member 102 itself for, e.g., added strength. Accordingly, in certain exemplary embodiments, the support member 102 may include a bottom plate instead of, or in addition to, top member 104 such that the leaf corralling apparatus 100 does not define the opening 118. Moreover, as stated above, in still other exemplary embodiments, the apparatus 100 may not include a support member 102, and the deflector plate 110 may be directly attached to or integral with the deck 16.

Figure 5:
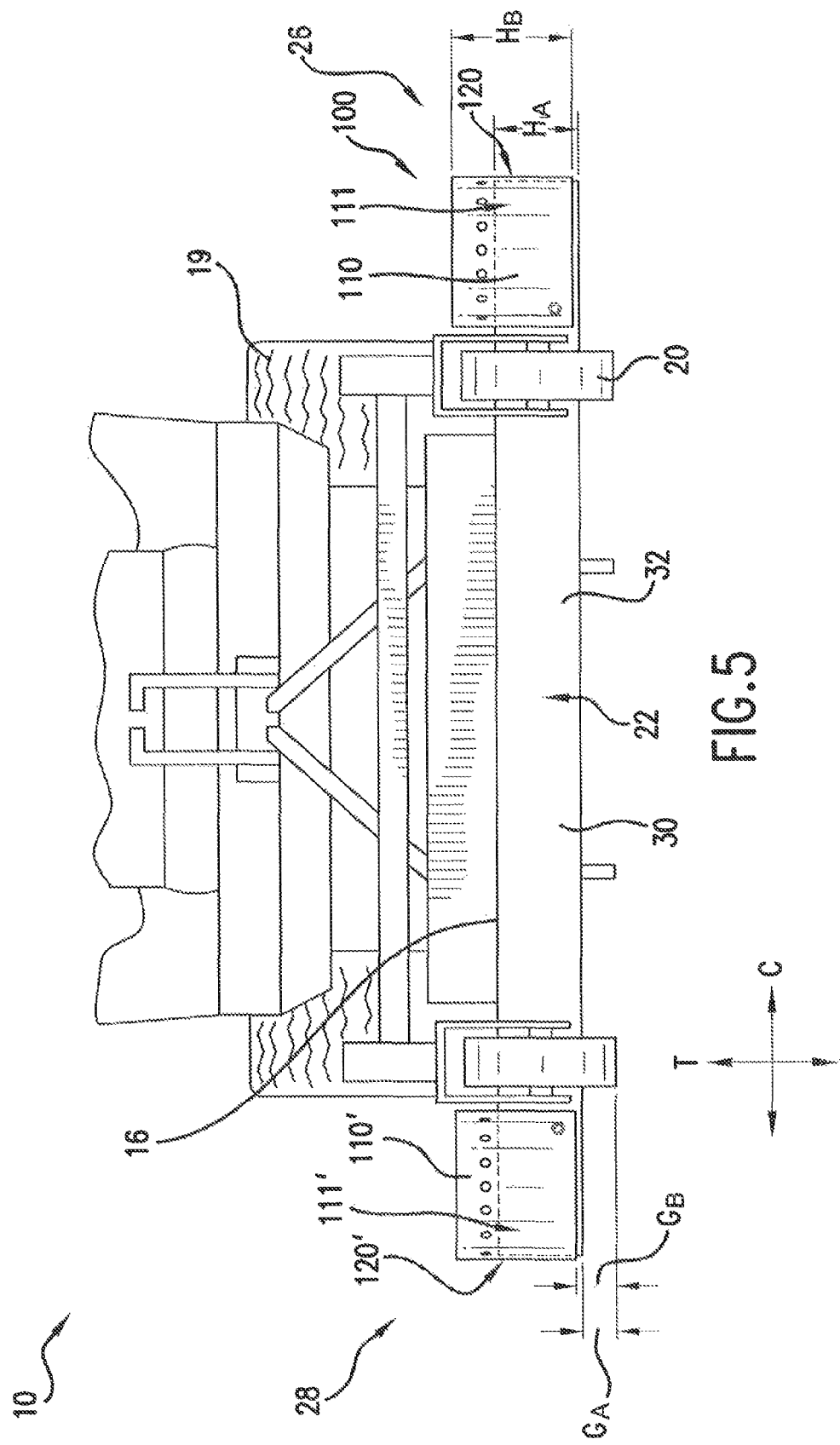
FIG. 5 is a front view of the deck portion of the exemplary lawnmower provided in FIG. 1.
Figure 6:
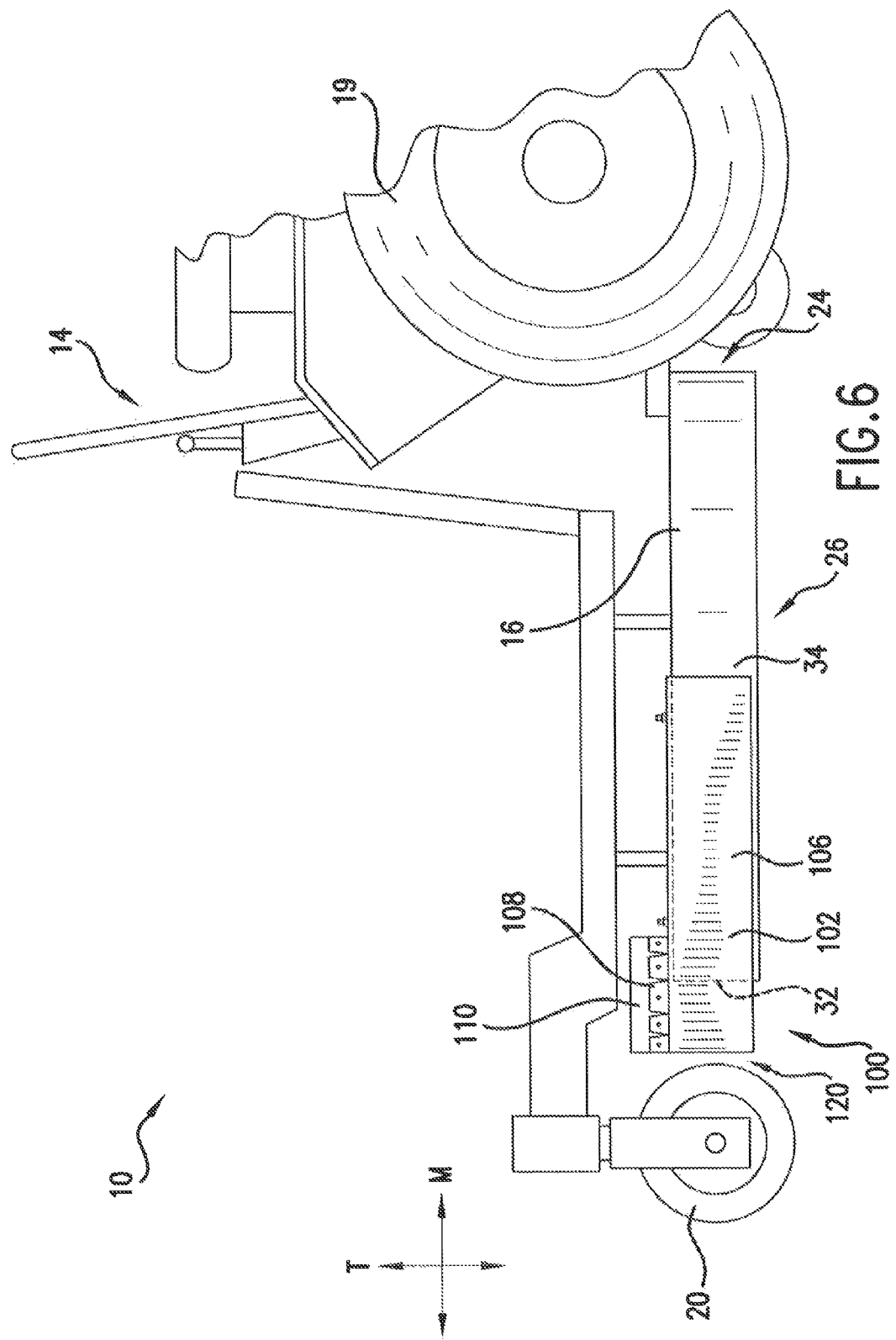
FIG. 6 is a side view of the deck portion of the exemplary lawnmower provided in FIG. 1.

Referring now to FIGS. 5 and 6, a front view of the deck portion of the exemplary lawnmower 10 of FIG. 1 is provided in FIG. 5, and a side view of the deck portion of the exemplary lawnmower of FIG. 1 is provided in FIG. 6. The lawnmower 10 of FIGS. 5 and 6 further defines a tangential direction T perpendicular to the mowing and cross directions M, C. For the exemplary embodiment of FIGS. 5 and 6, the tangential direction T corresponds to a vertical direction.

As shown, the outer periphery 30 of the deck 16 defines a height $H_A$ in the tangential direction T. The height $H_A$ may prevent a portion of any leaves from passing over a top of the deck 16 at the front end 22. Additionally, the height Ha may allow the outer periphery 30 to closely conform to the cutting area 40 of the blades 18. Similarly, as shown in the FIGS., the leaf corralling apparatus 100 also defines a height. More particularly, the deflector plate 110 extends generally in the tangential direction T and defines a height $H_B$ in the tangential direction T. Moreover, for the exemplary embodiment of FIGS. 3 and 6, the height $H_B$ of the deflector plate 110 is larger than the height $H_A$ of the outer periphery 30 of the deck 16. By way of example only, the height $H_B$ of the deflector plate 110 may be 5% larger than the height $H_A$ of the outer periphery 30 of the deck 16, or alternatively may be 10% larger, 15% larger, 20% larger, or 25% larger.

Additionally, as shown, the front end 22 of the deck 16 defines a ground clearance $G_A$ in the tangential direction T and the deflector plate 110 also defines a ground clearance $G_B$ in the tangential direction T. For the exemplary embodiment of FIGS. 5 and 6, the ground clearance $G_B$ is greater than the ground clearance $G_A$ of the front end 22 of the deck 16. By way of example only, the ground clearance $G_B$ of the deflector plate 110 may be 5% larger than the ground clearance $G_A$ of the deck 16, or alternatively may be 10% larger, 15% larger, 20% larger, or 25% larger.

As shown in FIGS. 5 and 6, and as used herein, "ground clearance" refers to the distance between an object and an anticipated position of the ground when the lawnmower 10 is in operation. More particularly, ground clearance refers to the distance between an object and a plane defined by the mowing direction M, the cross direction C, and a bottom position of the front wheels 20.

It should be appreciated, however, that in other exemplary embodiments, the deflector plate 110 may define any other suitable height $H_B$ or ground clearance $G_B$. For example, in other exemplary embodiments, the deflector plate 110 may define a height $H_B$ that is approximately equal to the height $H_A$ of the outer periphery 30 of the deck 16, or alternatively that is smaller than the height $H_A$ of the outer periphery 30 of the deck 16. Additionally, the deflector plate 110 may define a ground clearance $G_B$ that is approximately equal to the ground clearance $G_A$ of the deck 16, or alternatively that is smaller than the ground clearance $G_A$ of the deck 16.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal language of the claims.

What is claimed:

1. A lawnmower defining a mowing direction and a cross direction perpendicular to the mowing direction, the lawnmower comprising:
   a deck defining a centerline extending along the mowing direction of the lawnmower, wherein the deck comprises an outer periphery defining a first height in a tangential direction;
   at least one blade positioned within the deck defining a cutting area, the cutting area including an outermost point from the centerline, the outermost point located at a first distance from the centerline in the cross direction; and
   a leaf corralling apparatus comprising a deflector plate attached to or integral with the deck and defining a tip and a slanted portion, the tip located at a second distance in the cross direction from the centerline, the second distance approximately equal to or greater than the first distance, and the slanted portion extending inwardly towards the centerline and rearwardly towards the rear end of the deck, wherein the slanted portion of the deflector plate defines a second height in the tangential direction and wherein the second height is larger than the first height, the deflector plate configured to prevent an amount of leaves or other debris from being diverted around the deck of the lawnmower during operation of the lawnmower;
   wherein the deck defines a ground clearance in the tangential direction and the deflector plate also defines a ground clearance in the tangential direction, wherein the ground clearance of the deflector plate is greater than the ground clearance of the deck.

2. The lawnmower as in claim 1, wherein the leaf corralling apparatus further comprises:
   a support member attached to or integral with the deck of the lawnmower, wherein the support member attaches at least a portion of the deflector plate to the deck.

3. The lawnmower as in claim 2, wherein the deck defines an outer edge at a first side and the support member of the leaf corralling apparatus comprises an outer wall that extends from the outer edge of the deck to the tip of the deflector plate.

4. The lawnmower as in claim 2, wherein the leaf corralling apparatus further comprises an opening defined by the support member and the deflector plate configured to assist in preventing an amount of leaves or other debris from being diverted around the deck of the lawnmower during operation of the lawnmower.

5. The lawnmower as in claim 1, wherein the slanted portion of the deflector plate extends in a non-parallel direction with respect to the mowing direction.

6. The lawnmower as in claim 1, wherein the leaf corralling apparatus is in a fixed relationship to the deck.

7. The lawnmower as in claim 1, wherein the tip of the deflector plate defines an edge extending generally along the tangential direction, and wherein the tip and the slanted portion of the deflector plate define the ground clearance of the deflector plate.

8. The lawnmower as in claim 1, wherein the deck further comprises a leading edge at a front end and wherein the tip of the deflector plate extends past the leading edge of the deck in the mowing direction.

9. The lawnmower as in claim 1, wherein the deflector plate of the leaf corralling apparatus is at least partially attached to or integral with the outer periphery of the deck at a side of the deck and proximate a front end of the deck.

10. The lawnmower as in claim 1, wherein the deck further comprises an outer periphery and a first side, wherein the first side is positioned at a cross-directional end of the deck, and wherein the outer periphery defines a semicircular shape at the first side.

11. The lawnmower as in claim 1, wherein the leaf corralling apparatus is attached to a first side of the deck and wherein the lawnmower further comprises a second leaf corralling apparatus attached to a second side of the deck, the first side and second side being positioned at opposite cross-directional ends of the deck.

12. The lawnmower as in claim 1, wherein the leaf corralling apparatus is removably or permanently attached to the deck of the lawnmower.

13. The lawnmower as in claim 1, wherein the leaf corralling apparatus is made integrally with the deck of the lawnmower.

14. The lawnmower as in claim 1, wherein the tip of the deflector plate defines a width in the cross direction that is less than about 1 inch.

15. The lawnmower as in claim 1, further comprising a pair of front wheels attached to the deck and positioned away from the outer periphery of the deck.

16. An apparatus for preventing an amount of leaves or other debris from being diverted around a deck of a lawnmower, the lawnmower defining a mowing direction and a cross direction perpendicular to the mowing direction and comprising at least one blade positioned within the deck, the deck defining a centerline extending along the mowing direction and comprising an outer periphery defining a first height in a tangential direction, wherein the at least one blade defines a cutting area defining an outermost point located at a first distance in the cross-direction from the centerline, the apparatus comprising:
 a support member configured to attach to the deck of the lawnmower; and
 a deflector plate attached to or integral with the support member and defining a tip and a slanted portion, the tip located at a second distance in the cross direction from the centerline when the apparatus is attached to the deck, the second distance approximately equal to or greater than the first distance, and the slanted portion extending inwardly towards the centerline and rearwardly towards a rear end of the deck when the apparatus is attached to the deck, wherein the slanted portion of the deflector plate defines a second height in the tangential direction, and wherein the second height is larger than the first height, the deflector plate configured to prevent an amount of leaves or other debris from being diverted around the deck of the lawnmower during operation of the lawnmower.

17. The apparatus as in claim 16, wherein the apparatus is configured to be removably attached to the deck of the lawnmower.

18. The apparatus as in claim 16, wherein the apparatus is permanently attached to the deck.

19. The apparatus as in claim 16, wherein the apparatus further comprises an opening defined by the support member and the deflector plate, the opening configured to assist in preventing an amount of leaves or other debris from being diverted from the deck of the lawnmower.

20. A lawnmower defining a mowing direction and a cross direction perpendicular to the mowing direction, the lawnmower comprising:
 a deck defining a centerline extending along the mowing direction of the lawnmower, a front end, and an opposite rear end, wherein the deck defines a first ground clearance in a tangential direction and comprises an outer periphery defining a first height in a tangential direction;
 at least one blade positioned within the deck defining a cutting area, the cutting area including an outermost point from the centerline, the outermost point located at a first distance from the centerline in the cross direction;
 a leaf corralling apparatus comprising a deflector plate attached to or integral with the deck and in a fixed relationship to the deck, the deflector plate at least partially attached to or integral with the outer periphery of the deck at a side of the deck and proximate a front end of the deck, the leaf corralling apparatus defining a tip and a slanted portion, the tip located at a second distance in the cross direction from the centerline, the second distance approximately equal to or greater than the first distance, and the slanted portion extending inwardly towards the centerline and rearwardly towards the rear end of the deck, such that the slanted portion extends in a nom parallel direction relative to the mowing direction;
 wherein the deflector plate defines a second ground clearance in the tangential direction and wherein the slanted portion of the deflector plate defines a second height in the tangential direction, wherein the second ground clearance is larger than the first ground clearance and the second height is larger than the first height, and wherein the deflector plate is configured to prevent an amount of leaves or other debris from being diverted around the deck of the lawnmower during operation of the lawnmower;
 wherein the tip of the deflector plate defines an edge extending generally along the tangential direction, and wherein the tip and the slanted portion of the deflector plate define the ground clearance of the deflector plate.

\* \* \* \* \*